(12) United States Patent
Lankreijer et al.

(10) Patent No.: US 8,373,872 B2
(45) Date of Patent: Feb. 12, 2013

(54) METHOD AND SYSTEM FOR THE AUTOMATIC TRANSMISSION OF PRINTING DATA AND PARTICULARLY FOR MIRRORING PRINTING ORDERS

(75) Inventors: Herman Lankreijer, Hofsingelding (DE); Albin Stoderschnig, München (DE); Olaf Dünger, München (DE)

(73) Assignee: Océ Printing Systems GmbH, Poing (DE)

( * ) Notice: Subject to any disclaimer, the term of this patent is extended or adjusted under 35 U.S.C. 154(b) by 987 days.

(21) Appl. No.: 12/441,551

(22) PCT Filed: Sep. 20, 2007

(86) PCT No.: PCT/EP2007/059958
§ 371 (c)(1),
(2), (4) Date: Mar. 17, 2009

(87) PCT Pub. No.: WO2008/034873
PCT Pub. Date: Mar. 27, 2008

(65) Prior Publication Data
US 2009/0268228 A1    Oct. 29, 2009

(30) Foreign Application Priority Data

Sep. 22, 2006  (DE) .......................... 10 2006 044 870
Mar. 2, 2007   (DE) .......................... 10 2007 010 277

(51) Int. Cl.
*G06K 15/00* (2006.01)
*G06F 3/12* (2006.01)
*G06F 15/16* (2006.01)

(52) U.S. Cl. ..................... 358/1.14; 358/1.15; 358/1.13; 709/229; 709/248; 709/217; 709/219

(58) Field of Classification Search ........................ None
See application file for complete search history.

(56) References Cited

U.S. PATENT DOCUMENTS 5,586,291 A   12/1996   Lasker et al.
(Continued)

FOREIGN PATENT DOCUMENTS

| DE | 10 2004 047 327 A1 | 4/2006 |
| DE | 10 2006 044 870 B3 | 2/2008 |
| DE | 10 2007 009 737 A1 | 9/2008 |

(Continued)

OTHER PUBLICATIONS

Digital Printing, Technology and printing techniques of Océ digital printing presses, 9$^{th}$ edition, Feb. 2005 (ISBN 3-00-001081-5).
IBM Print Services Facility for z/OS. Download for z/OS (Version 4, Release 1.0) (Internet Citation 30, Nov. 2005 XP007903856.
JP 2006 252339—Sep. 21, 2006 Patent Abstracts of Japan.

(Continued)

*Primary Examiner* — Satwant Singh
(74) *Attorney, Agent, or Firm* — Schiff Hardin LLP (57) ABSTRACT

In a method or system for reception from a sender of a print data with a print job by a print server of a first printing system from a sender, with the print server of the first printing system acknowledging to the sender correct receipt of a predetermined data unit of print data according to a predetermined protocol. With the print server of the first printing system copying the print data to a mirror print server of a second printing system separate from the print server of the first printing system before execution of the respective acknowledgement for the predetermined data unit, and automatically using as a print server for continued execution of the print job given problems in storage of the print data on the print server of the first printing system, said mirror print server of the second printing system.

18 Claims, 6 Drawing Sheets

U.S. PATENT DOCUMENTS

| | | | |
|---|---|---|---|
| 6,292,905 B1 * | 9/2001 | Wallach et al. | 714/4.12 |
| 6,313,921 B1 | 11/2001 | Kadowaki | |
| 2003/0041086 A1 * | 2/2003 | Lankreijer | 709/102 |
| 2005/0117176 A1 * | 6/2005 | Benz et al. | 358/1.15 |
| 2006/0047836 A1 * | 3/2006 | Rao et al. | 709/229 |
| 2006/0294152 A1 * | 12/2006 | Kawabe et al. | 707/200 |
| 2007/0281300 A1 | 12/2007 | Russell et al. | |
| 2011/0067100 A1 * | 3/2011 | Fukuoh et al. | 726/21 |

FOREIGN PATENT DOCUMENTS

| | | |
|---|---|---|
| EP | 1 519 262 A1 | 3/2005 |
| JP | 06-259206 A | 9/1994 |
| KR | 10 2004 0099065 A | 11/2004 |

* cited by examiner

| Mirror server | Error reaction | Error correction |
|---|---|---|
| Primary mirror 1 | Terminate job if the copy to this mirror fails | none |
| Secondary mirror 1 | Continue even if copy to this mirror server fails | Copy all jobs that arrrive during the error phase |
| Secondary mirror 2 | Continue even if copy to this mirror server fails | none |

Fig.4a

| Mirror server | Error reaction | Error correction |
|---|---|---|
| Mirror 1 | Continue even if copy to this mirror server fails | none |
| Mirror 2 | Continue only if 2 copies to the mirror server have occurred | none |
| Mirror 3 | Change to mirror server <Mirror 4> if copy fails | Copy all jobs that arrive during the error phase |
| Mirror 4 | Standy mirror server; terminate if copy to this mirror server vails | none |

Fig.4b

| Parameter Designation | JCL Parameter | Download Header Parameter | Description |
|---|---|---|---|
| local connections | | | Number of the download connection for which the follwing setting should be used. Use wildcards in irder to activate it for all/ multiple connections. |
| remote hosts | | | Specifies which remote system can send data to the remote download connection. It can be specified as a host name with or without domains or Internet address. Wildcards can be used. |
| remote user | | -ous | Remote user name. Wildcards can be used. |
| remote printer | DEST | -opa definition | Remote target printer. Wildcards can be used. |
| remote class | CLASS | -opa class | Remote class. Wildcards or ranges can be used. |
| remote forms | FORMS | -opa forms | Remote form. Wildcards can be used |

Fig.5

| Local connections | Remote hosts | Remote users | Remote printers |
|---|---|---|---|
| * | 10.54.* | * | * |

Fig.6a

| Local connections | Remote hosts | Remote users | Remote printers |
|---|---|---|---|
| 5055 | Testserver.noware.com | Natia | P910 |
| 5056 | Testserver.anyware.org | Prod* | P950 |
| * | Domain Server | Admin | P* |

Fig.6b

| JCL Parameter | Option for Shell Script or Exit Routine | pdpr Attribute | enq, lp, qprt Flag |
|---|---|---|---|
| ADDRESS | -oaddress1<br>-oaddress2<br>-oaddress3<br>-oaddress4 | address1-text<br>address2-text<br>address3-text<br>address4-text | -oaddress1<br>-oaddress2<br>-oaddress3<br>-oaddress4 |
| BUILDING | -obu | building-text | -obuilding |
| CHARS | -ochars | chars | -ochars |
| CKPTSEC | Not transferrd to the AIX or Windows NT/2000 system | | |
| CLASS | -opa class | printer-pass-through=-opa=class | -opassthru class |
| COPIES | -ocop | copy-count | -ocopies |
| DATACK | -odatac | data-fidelity-problem-reported | -odatack |
| DCB=RECFM | -occ<br>-occtype | carriage-control-type | -occ<br>-occtype |
| DCB=OPTCD=J | -otrc | table-reference-characters | -otrc |
| DEPT | -ode | department-text | -odepartment |
| DEST | -opa destination | printer-pass-through=-opa=destination (NT/2000: maps using target-destination-name) | -opassthru dest |
| DEST=IP | -oipdest | NT/2000: printer-pass-through=-opa=ipaddr | N/A |
| DUPLEX | -odu | sides and plex | N/A |
| FCB | -opagedef | page-definition | -opagedef |
| FORMDEF | -of | form-definition | -oformdef |
| FORMS | x-opa forms | printer-pass-through=-opa=forms | -opassthru forms |
| INTRAY | -oin | printer-pass-through=-obin | N/A |
| NAME | -ona | name-text | -oname |
| NOTIFY | Not transferred to the remote system. | | |
| OFFSETXB | -ooffxb | x-image-shift-back | N/A |
| OFFSETXF | -ooffxf | x-image-shift | N/A |
| OFFSETYB | -ooffyb | y-image-shift-back | N/A |
| OFFSETYF | -ooffyf | y-image-shift | N/A |
| OVERLAYB | -oovlyb | overlay-back | N/A |
| OVERLAYF | -oovlyf | overlay-front | N/A |
| OUTBIN | -ooutbin | output-bin | -ooutbin |
| PAGEDEF | x-opagedef | page-definition | -opagedef |
| PRMODE | -oprmode | shift-out-shift-in | -oprmode |
| PRTQUEUE | -oprtqueue | N/A | N/A |
| RESFMT | -ore | font-resolution | N/A |
| ROOM | -oroom | room-text | -oroom |
| SEGMENT | -opa segmentid | printer-pass-through=-opa=segmentid | -opassthru segmentid |
| Note: The SEGMENT value is not transferred to the remote system. However, the segment identifier is transferred | | | |
| SYSOUT | -opa class<br>-opa forms | printer-pass-through=-oclass<br>printer-pass-through=-oforms | -opassthru class<br>-opassthru forms |
| TITLE | -oti | title-text | -otitle |
| TRC | -otrc | table-reference-characters | -otrc |
| UCS | -ochars | chars | -ochars |
| Note: N/A means that the command possesses no corresponding attribute or flag. | | | |

METHOD AND SYSTEM FOR THE AUTOMATIC TRANSMISSION OF PRINTING DATA AND PARTICULARLY FOR MIRRORING PRINTING ORDERS

BACKGROUND

The present preferred embodiment concerns a method and a device for reception of print data by a receiver from a sender, and in particular to mirror print jobs.

The preferred embodiment is provided for printing environments with electrophotographic high-capacity printers.

The receivers are hereby normally print servers. Such print servers are described in Chapter 15 in the book "Digitaldruck-Technik und Drucktechnologien der océ OCÉ Drucksysteme, 9th Edition, February 2005 (USBN 3-00-001019-X). These print servers are designated as océ OCÉ PRISMAproduction servers. Among other things, they establish the communication between large computing systems (mainframes) and the printing apparatuses. Such a print server can receive print data streams in different formats from multiple different mainframes and relay them to a plurality of further printing apparatuses. The transfer of the data can occur via different networks according to different protocols.

Many users of such electrophotographic high-capacity printing systems have concentrated their mainframes at one or a few sites. Often the operators of such mainframes do not implement the printing processes themselves; rather, they send their data to be printed to what are known as print centers. These print centers have one or more electrophotographic high-capacity printers that are connected with one another via a local network. A print server that receives the print data from the mainframe via an additional network (for example the Internet) is arranged in this local network.

The "Download" protocol from IBM is often used to transfer the data from a mainframe to a print server. This protocol is a feature of the IBM Print Services Facility (PSF) that can be purchased separately for the operating system OS/390 used on mainframes. Download automatically transfers print data via a TCP/IP network. An automatic error correction is executed with the Download protocol. In the event that the transfer of the print data could not be executed correctly, the print data are retransmitted. For this it is not necessary that an operator intervenes at the mainframe and re-executes the data transfer. The print data are stored in the mainframe until they have been completely and correctly transferred. Markers that are designated as checkpoints can be inserted into the print data stream generated by the mainframe. In the event that an error should occur in the transfer of the print data, the data are retransmitted again as of the last checkpoint. It is hereby not necessary to always transmit the entirety of the print data from the start.

Significant problems arise for operators of print centers when they lose the print data due to a computer malfunction or the print data are damaged to the extent that they are no longer usable. If the correct receipt has been acknowledged to the sender, it deletes the print data and they are no longer available for a retransmission. To avoid these problems, the Download protocol is provided with a function with which the print data can be simultaneously transferred to multiple receivers. This serves to transfer the print data to a print server and to mirror computer systems on which the print data are stored for a certain time in order to be able to remedy subsequently occurring errors in the processing of the print data by execution of the print data by the mirror computer system. However, the mirroring of the print data on mirror computer systems is the area of responsibility of the operator of the mainframe, not of the print centers. Even if the operator of the mainframe provides such a mirroring, the print data are deleted after the acknowledgement of the successful receipt, and there exists no possibility to re-request the print data. On the other hand, for the operator of the print center it is commercially very disadvantageous if he must re-request print data from his client that have already been correctly transmitted.

In order to avoid these problems, the print data must be stored on the mainframe or on its mirror computer systems until the complete printout has concluded. For this a confirmation to the mainframe would have occurred across the entire production chain after the successful printout so that the print data can be deleted again. Such a confirmation entails a significant communication effort. Mainframes send their print data to different print servers that in turn control a plurality of different printers. All the different print servers and printers would have to be set up for such a confirmation. Since known protocols for transfer of print data between mainframes and print servers do not provide such a confirmation, this is hardly possible in practice.

Software to mirror entire computer systems is known and could in principle also be used for such a print server that receives the print data. However, the print server would hereby have to be mirrored, which would have the result that data stored incorrectly in the print server would in turn be stored incorrectly on the mirror computer system. Problems generated by errors caused at the print server can thus not be avoided. For example, if a user at the print server accidentally deletes print data, they are also automatically deleted at the mirror computer system since this mirror computer system should represent an exact copy of the print server.

In this known software to mirror an entire computer system, every single storage process on a hardware disk of the computer system is immediately transferred to the mirror computer system and copied there.

An additional problem that the print data are sometimes transmitted to a wrong print server exists in the transmission of the print data. The individual print servers often have similar names, such that a wrong print server is input as a target given a typo or given an incorrect selection from a menu list. Although such a mis-addressing does not occur frequently, when it occurs it causes significant losses in high-capacity printing since a print product printed out at the wrong printing apparatus is for the most part unusable. If print data are transmitted to a wrong printing apparatus, the correct resources and form definitions are often not present, such that the print data are incorrectly printed out. In high-capacity printing, an incorrectly printed print job can mean a significant financial loss. It has previously been sought to establish such an incorrect transmission of print data by means of firewall programs that—using parameters that are contained in the header of the employed network protocol—decide whether the print data have been correctly forwarded. However, the headers of the network protocols (for example TCP/IP) contain only basic parameters such as the address of the sender and of the receiver. If a specific sender is cleared at a specific receiver, the firewall programs allow the receipt of all data from this sender.

However, a significantly more specific association between sender and receiver is often desired; for example, a sender should transmit a specific type of print job to a specific receiver and transmit a different type of print job to a different receiver.

In print servers based on Linux systems or other Unix derivatives it is known to check incoming print jobs by means of the protocol LP with the deamon lpd.perms for multiple parameters specific to the sender and receiver. For this a separate file that contains not only the address data of the sending computer and of the receiving computer but also multiple parameters regarding the user is respectively attached to the print job. A parameter regarding the printing apparatus is also listed therein.

It is disadvantageous in this system that the parameters to be monitored are stored in a separate file. If a hacker receives and copies this file, he can initiate a print job at a print server at any time. He can also introduce files into the print server that represent a security risk.

A server system designated with the trade name Océ PRIS-MAproduction emerges from "Digital Printing—Technology und [sic] Printing Techniques of Océ Digital Printing Presses" (I.I.c.) that processes or converts a broad palette of data structures that are then printed on IPDS printers. The Océ PRISMAproduction server system comprises a print job manager PJM (see Chapters 15.2.4 and 18.2) with which print jobs are generated at an arbitrary customer client and are executed and administered in this server system. The print job manager is also designated as a print order manager.

German Patent Application DE 10 2007 009 737 filed on 28 Feb. 2007 is referenced, and it is incorporated herein.

The method described therein processes job chaperone data of a print job that contain control parameters to control the print job. This method is executed in a printing system with a print job manager, one or more clients at which print jobs are generated, and a print server to supply the print jobs to a printing apparatus, and comprises the following steps:

receive a print job with job chaperone data from one of the clients via the print job manager, check the job chaperone data according to predetermined ticket rules and output a printing system-specific job ticket, and relay the print job with the job ticket to the print server.

This method is characterized in that the checking of the job chaperone data is centrally executed at the print job manager according to the predetermined ticket rules.

Since the job chaperone data are centrally (and advantageously exclusively) checked or monitored at the print job manager, the ticket rules applied for a specific print job can be reconstructed simply because the ticket rules are present only at a single location (namely the print job manager) and not, as was previously the case, at the most different clients, and the ticket rules can respectively be examined there at the print job manager. Furthermore, via the central execution of the inspection of the job chaperone data at the print job manager it is ensured that all incoming job chaperone data are inspected according to the same ticket rules and are correspondingly modified and corrected as necessary.

Furthermore, the ticket rules are to be centrally administered via the central execution of the inspection of the job chaperone data, whereby they can also be centrally monitored, and it is avoided that similar job chaperone data or similar errors in job chaperone data are corrected differently.

An additional advantage of the central inspection of the job chaperone data at the print job manager is that the inspection of the job chaperone data occurs very close to the concrete printing apparatus in the process chain, such that this inspection can be conducted very specifically for the respective printing apparatus. The quality of the inspection can hereby be significantly increased. Given the execution of the job chaperone data at the clients the problem exists that the clients can communicate with different print job managers, such that an inspection of the job chaperone data that is executed at the clients must be adapted to the printing apparatuses that can be reached with the different print job managers, which again is very difficult.

Via the central administration of the ticket rules it is also possible to provide the operator with tools that facilitate the generation and administration of the ticket rules. It is in particular appropriate to provide a graphical user interface (GUI) in which the ticket rules can be generated and administered, and to provide a software module with which the syntax of the edited ticket rules is automatically checked for a correct syntax.

SUMMARY

It is an object to achieve a method and a device for the reception of print data by a receiver from a sender, which method and device allows a secure handling of the print data at the receiver in a simple manner.

In a method or system for reception from a sender of a print data with a print job by a print server of a first printing system from a sender, with the print server of the first printing system acknowledging to the sender correct receipt of a predetermined data unit of print data according to a predetermined protocol. With the print server of the first printing system copying the print data to a mirror print server of a second printing system separate from the print server of the first printing system before execution of the respective acknowledgement for the predetermined data unit, and automatically using as a print server for continued execution of the print job given problems in storage of the print data on the print server of the first printing system, said mirror print server of the second printing system.

It is also an object to develop a method, a printing system and a computer program to mirror print jobs with job chaperone data from a print server receiving the print jobs to a print server of an additional printing system, such that given a failure of one of the print servers the printout of the print data can occur reliably, quickly and correctly.

BRIEF DESCRIPTION OF THE DRAWINGS

FIG. 7 shows an additional table with parameters; and

DESCRIPTION OF THE PREFERRED EMBODIMENTS

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated device and method, and such further applications of the principles of the invention as illustrated as would normally occur to one skilled in the art to which the invention relates are included.

The print data are transferred from the sender to the receiver according to a predetermined protocol for the reception of print data by a receiver from a sender. The correct receipt of a predetermined data unit of print data is respectively acknowledged by the sender [sic]. The method for automatic transmission of print data is characterized in that the receiver copies the print data for a specific data unit before the execution of the respective acknowledgement.

Via the immediate copying of the print data before it is acknowledged with regard to the sender it is ensured that an error occurring at the receiver after the acknowledgement cannot have an effect on the copied print data. In contrast to this, if an error occurs before the acknowledgement of the print data, a correct acknowledgement does not even occur, whereby the sender must assume that the print data have not been correctly received. The sender will therefore not delete the print data and they are available for an additional transmission. In contrast to this, if an error occurs at the receiver after the acknowledgement, it can be that the correctly received print data have been damaged. Since a copy of these print data has been generated, this copy can be resorted to and the processing of the print data can be continued without damage.

The method to automatically transfer print data allows a plurality of options as to how the copied or mirrored print data are used in the event of error. It is also possible to copy the print data multiple times.

The print data are often transferred from the sender to the receiver in a compressed form. In the preferred embodiment of the invention, the compressed print data are copied. The storage demand to store the copied data is hereby kept low. The data are for the most part not copied within a computer system but rather are copied from a computer system to a mirror computer system. For this data would have to be transferred via a data line. The transfer of the data line delays the copying process. This delay is kept down via the copying of the print data in a compressed version.

According to a further preferred embodiment in the present invention, the copying of the print data occurs optimally close to the input of the receiver, in particular at an interface module, a copier module immediately downstream of the interface module, or at a buffer module immediately downstream of the interface module.

The solution pertains to a method to receive print data via a receiver from a sender in which the print data are transmitted according to a predetermined protocol. The receiver checks whether the print data originate from a correct sender, in that the receiver checks (with a module to receive and store the print data using multiple parameters that are contained in the header according to the predetermined protocol) the correctness of the sender before the print data are stored by the module.

Since multiple parameters are inspected, the sender can be very specifically checked, wherein a profile with a plurality of parameters can be interrogated. Since the parameters are extracted from the header of the transmission protocol, third parties cannot detect which parameters are relevant for the access to the receiver. Even if a third party in the Internet should capture such a message, he can first of all not recognize that the parameters contained in the header are the data relevant for access, and even if he should have knowledge of this, he cannot recognize which parameters are relevant for the access to the receiver.

If the parameters that are drawn upon for inspection of the sender co-determine the content of the print job, a third party cannot send arbitrary print jobs to the receiver, even if he should be aware of all parameters as access elements. If one or more parameters can co-determine the content of the print job, only those print jobs with this parameter set are transmitted to the receiver. Other types of print jobs are automatically rejected.

The parameters of multiple headers are advantageously drawn upon for inspection of the sender. For example, if print data are transferred via the Internet from sender to receiver by means of the Download protocol, the print data have not only a header of the Download protocol but also of the Internet protocol. Parameters from both headers can be used to inspect the sender. The selection and composition of the parameters is incumbent solely on the receiver, who can thus individually determine according to which criteria he allows print data from senders.

In the method to mirror print jobs that contain job chaperone data, the following steps are executed by a print server of a first printing system on a print server of a second printing system (the mirror server):
    the received print jobs are mirrored on the mirror server,
    at least one mirror job ticket is generated using the job chaperone data, and
    the mirror job ticket is copied on the mirror server.

Since a mirror job ticket that is copied to the mirror server is generated from the job chaperone data with the method to mirror print jobs, given a problem the printout of the print job can be continued reliably, quickly and correctly using the mirrored print job and the mirrored mirror job ticket.

Two mirror job tickets are advantageously generated that are specific to a respective one of the two printing systems and are copied to the mirror server. The mirrored print jobs and/or mirror job tickets are blocked for a predetermined duration, and/or the blocking is only lifted when a data connection between the mirrored printing systems is interrupted. The blocking can also be manually lifted by an authorized operator.

In a development of the preferred embodiment, two or more printing systems can mutually, symmetrically mirror the print jobs so that all printing systems are arranged equally in parallel.

The generation of the mirror job ticket appropriately occurs by means of ticket rules centrally stored in a ticket rule module in a print job manager. Specification job tickets are hereby used that are specific to the printing systems and/or the incoming print jobs, meaning that control parameters specific to the respective printing systems are contained in the print jobs.

A few terms are subsequently defined to explain the present preferred embodiment.

An entire job contains at least one document processing job, in particular a print job.

A print job (job) contains at least one print file to be printed.

An entire job ticket (order ticket) contains information about An entire job for example delivery address, job date, desired delivery date etc.

A job ticket contains all data required to execute a print job. These data comprise control parameters that are relevant in a workflow for the print job (job workflow). The job ticket is coded in a corresponding ticket format.

A specification job ticket contains standard data that are suitable to output a print job that contains no additional processing information in an existing printing system or an existing print environment. Such data are control parameters and can, for example, be names or addresses of printing apparatuses that are connected to the respective print server.

What is to be understood by a data ticket is information that is generated together with the print data by a system generating a print job, for example a print job generated MFS mainframe computer system. The scope of such data is very limited (depending on the system), and their format is not standardized, which is why they are not viewed as job tickets in the above sense.

The job chaperone data can comprise both an entire job ticket, a job ticket and/or a data ticket or control parameters that are attached in a different form to a print job. Control parameters are more often inserted into the file names of the print job.

If no job ticket is attached to the print job, a printing system-specific job ticket is generated at the print job manager by means of the specification job ticket and possible additional control parameters and the ticket rules. In contrast to this, if a job ticket is attached to the print job, using the ticket rules the job ticket is inspected as to whether it is suitable as a printing system-specific job ticket and, if necessary (which is the rule), modified and in particular expanded with printing system-specific parameters from the specification ticket.

Figure 1:
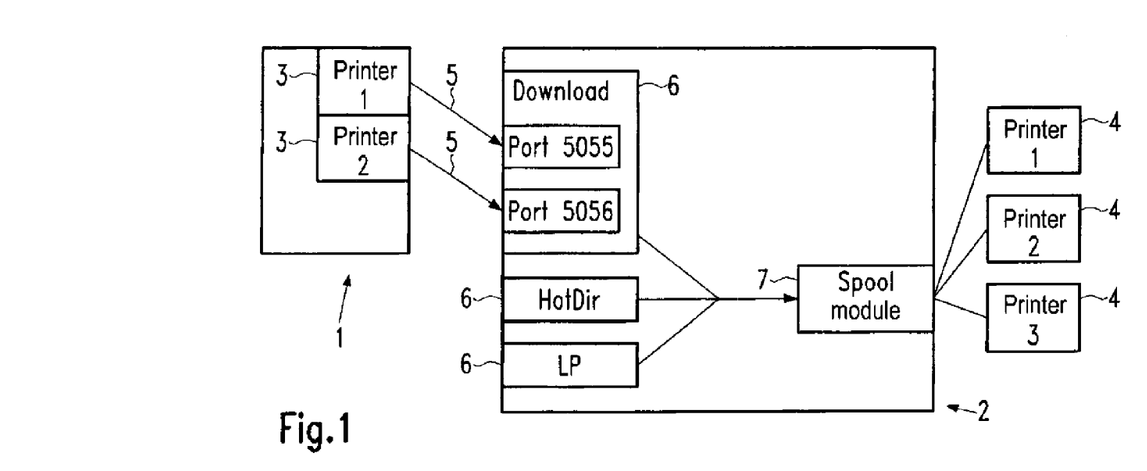
FIG. 1 shows schematically, the design of a printing system for the transmission of print data, with a mainframe, a print server and multiple printers.

The method to automatically transfer print data (FIG. 1 through 7) serves to transfer print data from a sender 1 to a receiver 2. The sender 1 is normally a mainframe computer on which a large data set of print data is generated. These print data are for the most part sent distributed to multiple receivers 2. Only a single sender 1 and a single receiver 2 are shown in FIG. 1 to simplify the presentation.

The data communication between the sender 1 and the receiver 2 can be regulated by means of different protocols. In mainframe computers from IBM, the Download protocol (which is based on the TCP/IP protocol) is very common. In Unix systems, print data are transferred with the LP (Line Printer) protocol. Additional suitable protocols are FTP (File Transfer Protocol) and NFS (Network File System) that are applied by program modules at the sender 1 for the automatic transfer of the print data. The applicant offers such a program module (HotDir) that provides a folder in which incoming print data are automatically detected and relayed to a receiver.

In the present exemplary embodiment, the sender 1 is a large-scale computer or mainframe from IBM that operates with the OS/390 operating system and the Download protocol for the transfer of the print data. Two printer drivers 3 ("Printer 1" and "Printer 2") are installed on the sender 1, which drivers prepare and relay the print data for transmission to a printer. A print server can simulate such a printer for the mainframe so that the printer can receive the print data from the mainframe. The print server or receiver 2 can freely distribute the received print data to one of many printers 4 connected to the receiver 2.

The term "printer driver" here is not used in the sense of the printer drivers known from personal computers that prepare and even possibly raster the print data so that the respective printing apparatus can directly process them. In electrophotographic high-capacity printing systems such a preparation of the print data occurs in the print server and/or in the control device of the respective printing apparatus. Rather, the printer drivers 3 of the sender 1 check the incoming print data as to whether they are suitable for the printing apparatus at which they should be printed and prepare the print data for transmission to the receiver 2 via a network 5. The printer drivers 3 can hereby prepare print data for the transfer at the sender 1 in that specific files are assembled into a print job, these files are compressed and possibly are encrypted.

The print data so prepared are received by the receiver 2. The present receiver 2 is a print server, in particular a PRISMAproduction print server. This print server 2 possesses three different interface modules 6 to receive print data by means of different protocols. One of the interface modules 6 is designed to receive data by means of the Download protocol; the other [sic] interface module 6 is designed to receive data is a HotDir directory; and the third interface module 6 is designed to receive data by means of the LP protocol. The interface module 6 to receive data by means of the Download protocol is designated in the following as a download interface 6. Two port numbers according to the TCP protocol are installed at this interface module 6, with which port numbers the data structures between the sender 1 and the receiver 2 are identified. These port numbers are non-transiently allocated (assigned numbers). The print data arriving at the interfaces are relayed in the print server 2 to a spool module 7 that buffers the print data and then transfers them to the individual printers 4. The download interface is designed as a program that runs in the background, wherein no direct user interventions typically occur. Under Unix and its derivatives such programs are designated as daemons (Disc and Execution Monitor). In Microsoft Windows, the corresponding programs are "Services". A daemon can run even when no user is logged in at a computer.

Figure 2:
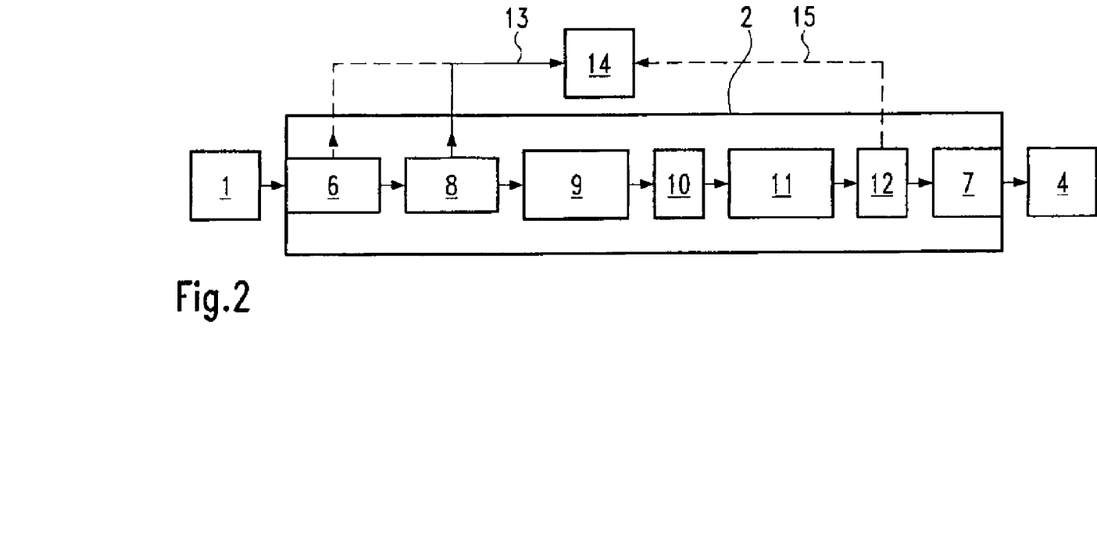
FIG. 2 shows a print server from FIG. 1 with the modules to receive and process print data.

FIG. 2 shows the program modules of the print server 2 that are relevant to receiving and relaying by means of the download interface in somewhat more detail in a block diagram. A buffer module 8 in which the incoming print data are buffered is subsequently arranged at the download interface 6 in the print server 2. A decryption and decompression module 9 that writes the decrypted and decompressed data into an additional buffer module 10 follows the buffer module 9. A print data processing unit 11 reads the print data stored in the buffer module 10 from the buffer module 10 and implements the necessary processing steps.

The print data processing unit 11 writes the processed print data into an additional buffer 12 from which they are written into the spool module 7. The buffer modules 8, 10, 12 are all inherited from the same class and correspond to the buffer class described in US Published Patent Application US 2003/0041086 A1. This document is herein incorporated by reference.

In the exemplary embodiment shown in FIG. 2, the buffer module 8 is designed such that it copies the incoming print data and relays them via a data line 13 to a mirror computer system 14. This mirror computer system 14 merely comprises in a simplest case an additional hard disk in the print server 2. The mirror computer system 14 is preferably a computer system that is designed independent of the print server 2. In particular, the mirror computer system 14 should be remote; it should most of all be arranged in a different building than the print server 2. It is hereby ensured that, given damage to the print server 2 due to fire or the like, the mirror computer system 14 is not affected, and the print data stored on it continue to be available.

The buffer module 8 with the copying function of the incoming print data is arranged before the decryption and decompression module 9 so that the print data are relayed in the compressed and encrypted state to the mirror computer system 14. The data volume to be transferred via the data line 13 is hereby kept low, and a fast copying of the print data to the mirror computer system 14 is enabled.

The buffer module 8 is designed such that, after the conclusion of the copying of the arrived print data, this is confirmed to the download interface 6. The download interface 6 only executes the acknowledgement (that the print data have been correctly received) with regard to the sender 1 when the corresponding acknowledgement from the buffer module 8 is present. It is hereby ensured that an error at the print server 2 (for example a crash) does not lead to the situation that incoming print data are properly confirmed with regard to the sender 1 but cannot be copied at the print server 2 into the mirror computer system 14. Via this slight delay of the acknowledgement of the correct receipt of the incoming print data it is ensured that the print data are available at least at the print server 2 or at the mirror computer system 14 if they have been properly acknowledged to the sender 1, even given the occurrence of a problem at one of the two computers.

The delay of the acknowledgement of the correct arrival of the print data is primarily caused by the transmission of the copied print data via the data line 13. This is therefore particularly advantageous when the print data are transferred in a compressed state to the mirror computer system 14. This is also advantageous when a fast data connection is used.

As is indicated in FIG. 2 by the dashed-line data line 13, in an alternative embodiment of the present invention the incoming print data are also copied in the download interface 6 and are relayed from there to the mirror computer system 14. Such an embodiment has the advantage that the mirroring and acknowledgement are monitored from a single module (the download interface 6). An acknowledgement synchronous with the mirroring of the print data can hereby be realized in a simple manner.

Alternatively, it is also possible to provide an additional copying module between the download interface 6 and the buffer module 8, which additional copying module has the single task to copy the print data and relay them to the mirror computer system 14.

In a development of the present preferred embodiment, it is also possible to copy the print data to the mirror computer system 14 after specific processing processes, in particular at the output of the receiver 2. In FIG. 2, a data connection 15 with a dashed line from the buffer module 12 to the mirror computer system 14 is shown by way of example. The buffer module is designed such that all print data stored with the buffer module 12 are copied via the data connection 15 to the mirror computer system 14 before they are relayed to the spool module 7. The data connection 15 is logically a data connection independent of the data connection 13. These two data connections naturally use the same physical data line. Such an additional mirroring of the print data is in particular appropriate when a complicated processing of the print data occurs at the receiver 2. For example, the print data can be rastered at the receiver 2, which itself can take a few hours for large print jobs given the computing power available today. These rastered print data can thus be copied to the mirror computer system 14. In the scope of the preferred embodiment, it is also possible to provide such a copying function at multiple points in the receiver 2, in particular at all buffer modules 8, 10, 12.

The system for automatic transfer of print data in which the print data are copied to a mirror computer system fundamentally differs from conventional mirroring methods in that every arbitrary write process on a storage medium (in particular the hard disk of the receiver 2) is not copied to the mirror computer system 14, rather, on the one hand only predetermined data (namely the print data) are copied, and on the other hand these data are copied only at specific process stations. The necessary data transfer between the receiver 2 and the mirror computer system 14 is hereby kept small in comparison to conventional mirroring methods.

The selection/establishment of the data to be copied or to be secured and/or of the mirror computer systems 14 can in particular occur in a menu-driven manner by a user. The targeted copying of predetermined data at specific process points in the process workflow of the receiver 2 produces an additional advantage relative to conventional mirroring methods. Different rights for the user for processing of the print data can be assigned at the receiver 2 and at the mirror computer system 14. For example, a user can have the right to delete print data at the receiver 2. However, this right does not automatically have to extend to the mirror computer system 14. If a user accidentally deletes print data at the receiver 2, they continue to exist at the mirror computer system 14. Furthermore, it is possible to design a delete function at the receiver 2 such that it is automatically executed with a time offset at the mirror computer system 14. The time offset can be between a few hours and a few days. It is hereby ensured that the data at the mirror computer system 14 are still available at least for some time after an accidental deletion.

The workflow of the method for automatic transfer of print data is subsequently explained using the diagram shown in FIG. 3.

In this example a print job comprising two print files (data file 1, data file 2) is transmitted from the sender 1 to the receiver 2. In FIG. 3 the interface from the sender 1 to the network 5 is designated with MF (mainframe); the interface between the network 5 and the receiver is designated with I-PS (input print server); and the interface of the receiver 2 with the data line 13 leading to the mirror computer system 14 (M) is designated with O-PS (output print server).

Figure 3:
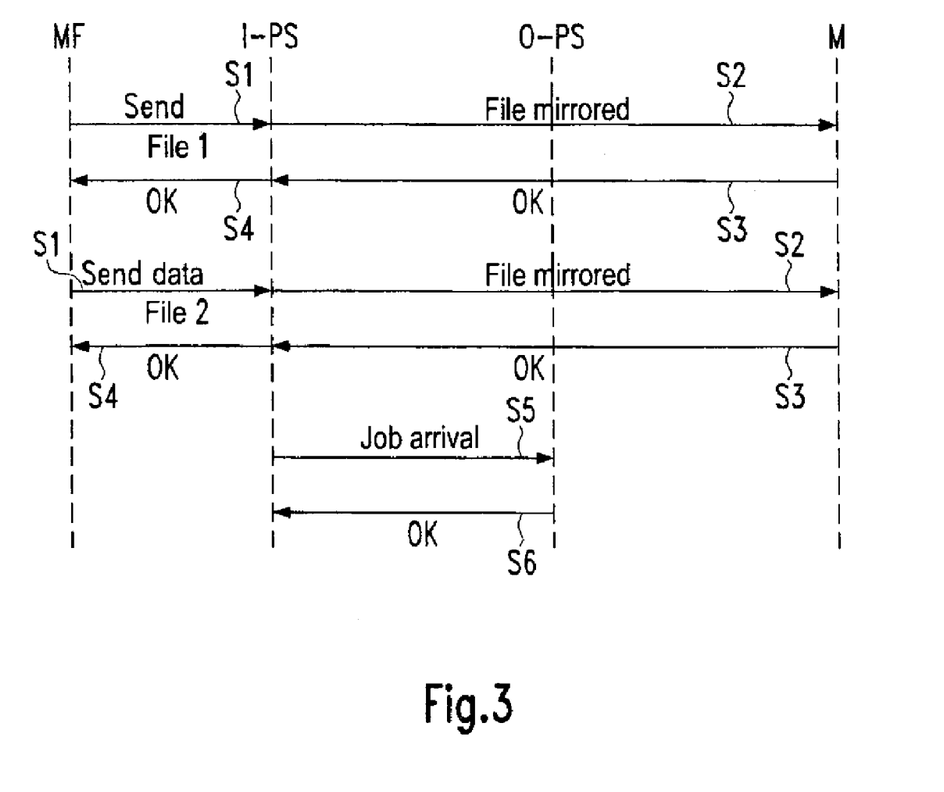
FIG. 3 illustrates a diagram to represent the chronological workflow of the transmission and correction of print data of a print job.

The first print file (data file 1) is transferred from the sender to the receiver with Step S1 (see arrow in FIG. 3). In the receiver the first print file is copied and transferred to the mirror system with Step S2. The mirror computer system acknowledges the correct receipt of the print file 1 in Step S3. The correct receipt of the print file is hereupon confirmed by the receiver to the sender (Step S4).

The same Steps S1 though S4 are executed to transfer the second print file (data file 2). In the event that the print job comprises more than two print files, Steps S1 through S4 are repeated correspondingly often for the transfer of a respective print file.

If all print files have been transferred correctly, the execution of the print job is started in the receiver with Step S5, wherein the print files are transmitted to the corresponding printing apparatus. The receiver then receives a corresponding confirmation (Step S6) after execution of the print job by the printing apparatus.

The method for automatic transmission of print data is explained above using an exemplary embodiment in which the data are transferred from the sender to the receiver by means of the Download protocol, wherein the receipt of a respective print file is respectively acknowledged. Given use of checkpoints, the acknowledgement occurs after the correct receipt and the correct copying or mirroring of a data unit of the print data that is limited by a checkpoint or the end of the print file. The data unit to be transferred and to be copied is thus not always a complete print file; rather, it can also be comprised of segments of a print file.

If problems should arise at the receiver or print server in the saving of the print data, the system comprised of the print server and the mirror computer system can be designed such that the mirror computer system is automatically used as a print server. For this the mirror computer system is to be provided with all functions or program modules of the print server that are necessary for relaying and processing the print data.

In principle the correct receipt of the print data is only acknowledged after the copying of the print data to the mirror computer system. In the event that the copying of the print data cannot be correctly executed, the entire transmission of the print data is terminated. However, in an alternative embodiment it is also possible that the receiver could acknowledge the correct receipt of the print data to the sender even if the print data are not correctly copied to the mirror computer system, insofar as the print data have been correctly received and correctly stored on the receiver. After correcting the error that was the cause of the incorrect copying, it is possible to subsequently copy the uncopied print data to the mirror computer system.

The system for automatic transfer of print data can also be provided with multiple mirror computer systems. The print data can hereby be simultaneously copied to the multiple mirror computer systems. However, it is also possible to copy the print data to only a single mirror computer system and, in the event that problems should hereby be presented, the print data are copied to another mirror computer system so that their correct storage is ensured.

If multiple mirror computer systems are present, it is also possible that, given the occurrence of an error, the copying to a specific mirror computer system is only continued when at least one predetermined number n of copies of the data to be secured could be successfully generated on the multiple mirror computer systems.

Errors can thus be reacted to according to the rules listed below (error reaction). These rules for an error case are configured at the receiver 2. This configuration of a specific rule respectively occurs for a specific mirror computer system 14. The rules are:

(1) Termination of the data transfer from the sender to the receiver when an error occurs in the copying to the configured mirror computer system.
(2) Continuation of the data transfer from the sender to the receiver even given an error at the configured mirror computer system.
(3) Continuation of the data transfer from the sender to the receiver only if n copies of the data to be secured have been successfully generated.
(4) Switching of the copying process to a predetermined different mirror computer system if an error occurs at the configured mirror computer system.
(5) Use as a replacement mirror computer system (standby mirror server) that is used only if an error occurs either at the receiver or at another mirror computer system.

In the event of error there are two possibilities of how an error can be remedied at a mirror computer system (error recovery). On the one hand it can be sought to copy all print data or data units that have been received since the occurrence of the error at the receiver to the mirror computer system. On the other hand, the mirror computer system can also be configured such that the print data received since the occurrence of the error are no longer copied to this mirror computer system.

Figure 4A:
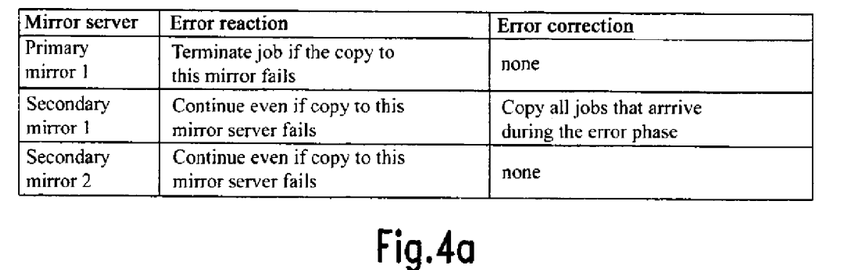
FIGS. 4a, 4b show respectively, a configuration of multiple mirror computer systems.

FIG. 4*a* shows a configuration example with three mirror computer systems that are designated as primary mirror, secondary 1 mirror and secondary 2 mirror. If an error occurs in the copying to the primary mirror, the data transfer from sender to receiver is terminated. The print data or the corresponding data unit must be transmitted again.

If an error occurs at the secondary 1 mirror, the data transfer is continued without change. After correcting the error, all print data received at the receiver in the meantime and stored there are copied to the secondary 1 mirror.

The transfer of the data from the sender to the receiver is continued in the secondary 2 mirror given an error. However, after correcting the error at the secondary 2 mirror the data received in the meantime are no longer copied to this mirror.

Figure 4B:
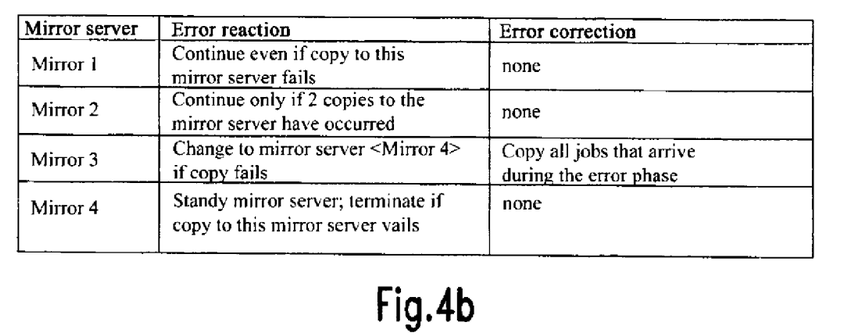
Figure 5:
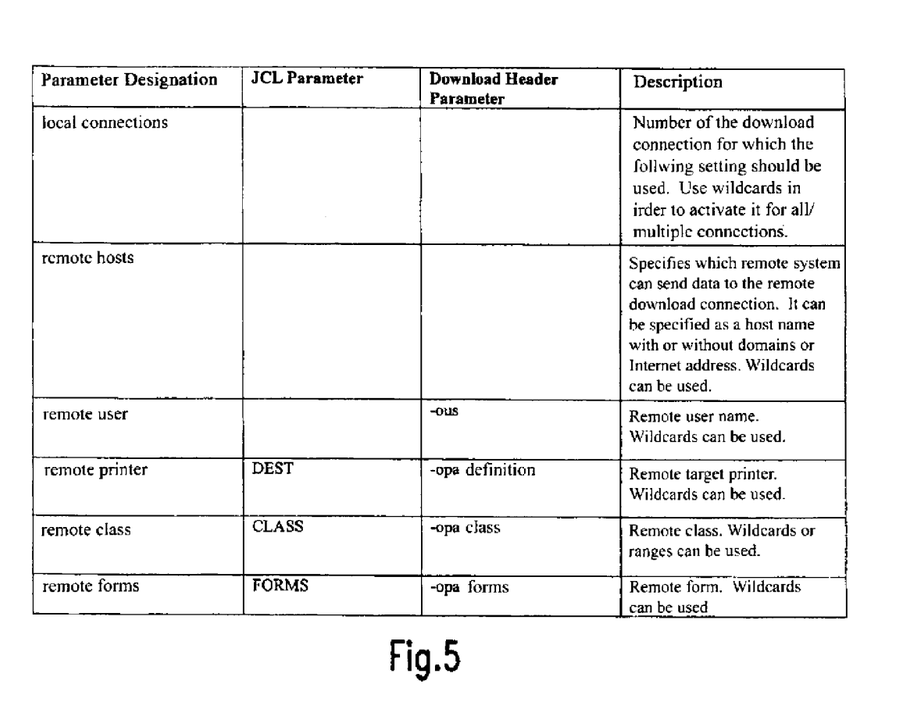
FIG. 5 illustrates a table with a parameter list.

FIG. 4*b* shows a second configuration. This configuration comprises 4 mirror computer systems that are designated with mirror 1, mirror 2, mirror 3 and mirror 4. Mirror 4 forms a replacement mirror computer system of mirror 3. Mirror 1 is configured such that the data transfer from sender to receiver is continued even if an error occurs at this mirror computer system. Mirror 2 is configured such that the data transfer from sender to receiver is interrupted if an error occurs at this mirror computer system and at least two copies could not be successfully generated. This means that the data transfer is interrupted if an error occurs at mirror 2 and mirror 1 fails, or mirror 3 and its replacement mirror computer system (mirror 4) fail. Furthermore, the data transfer is terminated if mirror 4 fails.

Since the rules for each mirror computer system are individually configured, in principle an arbitrary number of mirror computer systems can be provided and interact in different ways.

In an advantageous development of the receiver, its interface module is designed such that it initially checks the incoming print data as to whether they originate from a correct sender, in that use of the interface module the print data using multiple parameters that are contained in a header according to the protocol with which the print data are transferred from the sender to the receiver. The correctness of the print data is checked before these are stored by the interface module on the receiver. This aspect of the present preferred embodiment represents an independent idea of the preferred embodiment.

In the present exemplary embodiment the print data are transferred by means of the Download protocol in combination with the TCP/IP protocol. A table with typical parameters for monitoring the correct print data is shown in FIG. 4. The parameter "remote hosts" is in the header of the TCP/IP protocol. All remaining parameters from the table in FIG. 4 are specified in the header of the Download protocol. The parameters "local ports" and "remote hosts" represent general address data. Such address data are used in firewall programs to monitor the correctness of the corresponding data. The additional parameters "remote users", "remote printers", "remote class" and "remote forms" are specific parameters for the print job or the printers that are hereby to be used or for the user. Such specific parameters are not used to monitor the incoming data in firewall programs. The parameters "remote class" and "remote forms" are particularly specifically for monitoring of the incoming data since these two parameters co-determine the content of the print data or of the print job. The parameter "remote forms" thus indicates which forms are used. The parameter "remote class" describes, for example, a specific printer queue in a specific receiver. This printer queue is provided to transfer print data to a specific printer or to a specific group of printers.

Figure 6A:
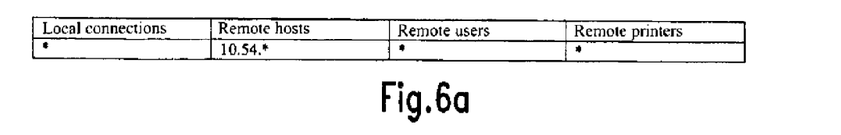
FIGS. 6a, 6b show respectively, a configuration of the access profile for print data.

FIG. 6*a* shows a configuration example, wherein an "asterisk" is used as a placeholder for which arbitrary values can be used in the parameters. The configuration according to FIG. 5*a* thus means that all users can transmit their print data with arbitrary ports to arbitrary printing apparatuses as long as its IP address begins with "10.54".

Figure 6B:
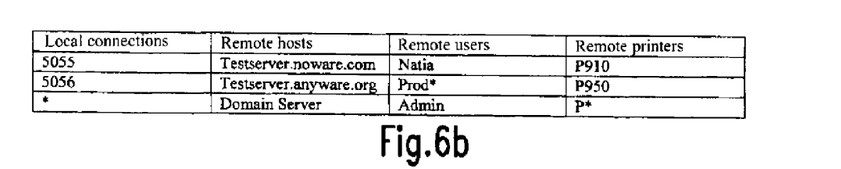

Given the configuration according to FIG. 6*b*, the user "Natia" can transmit data from the printer "P910" at the sender "Testserver.nowhere.com" to port 5055. The user whose name begins with "Prod" can transmit his print data via port 5056 from the sender "Testserver.anywhere.org" to the printing apparatus "P950".

The user "Administration" can use any arbitrary printer that begins with a "P" and transmit his print data from the sender "Doman Server" to an arbitrary port.

It is important for the preferred embodiment that the receiver can freely define the rules according to which the print data are permitted for reception using the parameters from the headers. The parameters listed in the above example are preferably used. However, in principle other parameters listed in the headers are also used. FIG. 7 shows a list of such additional JCL parameters (JCL: Job Control Language). This table is taken from the manual by IBM for Print Services Facility for OS/390 & z/OS, Download for OS 390, Version 3, Release 3.0 (S544-5624-02), 2002.

In the exemplary embodiments of the present invention that are explained above, a device that is designed as a print server is used to receive print data (receiver 2). Such a print server is a computer with a processing unit, a memory unit and a computer program that serves to receive, process and relay print data. The computer program is designed to execute the method for automatic transfer of print data.

The preferred embodiment itself can also be realized as a computer program product that is stored on a data medium.

Figure 8:
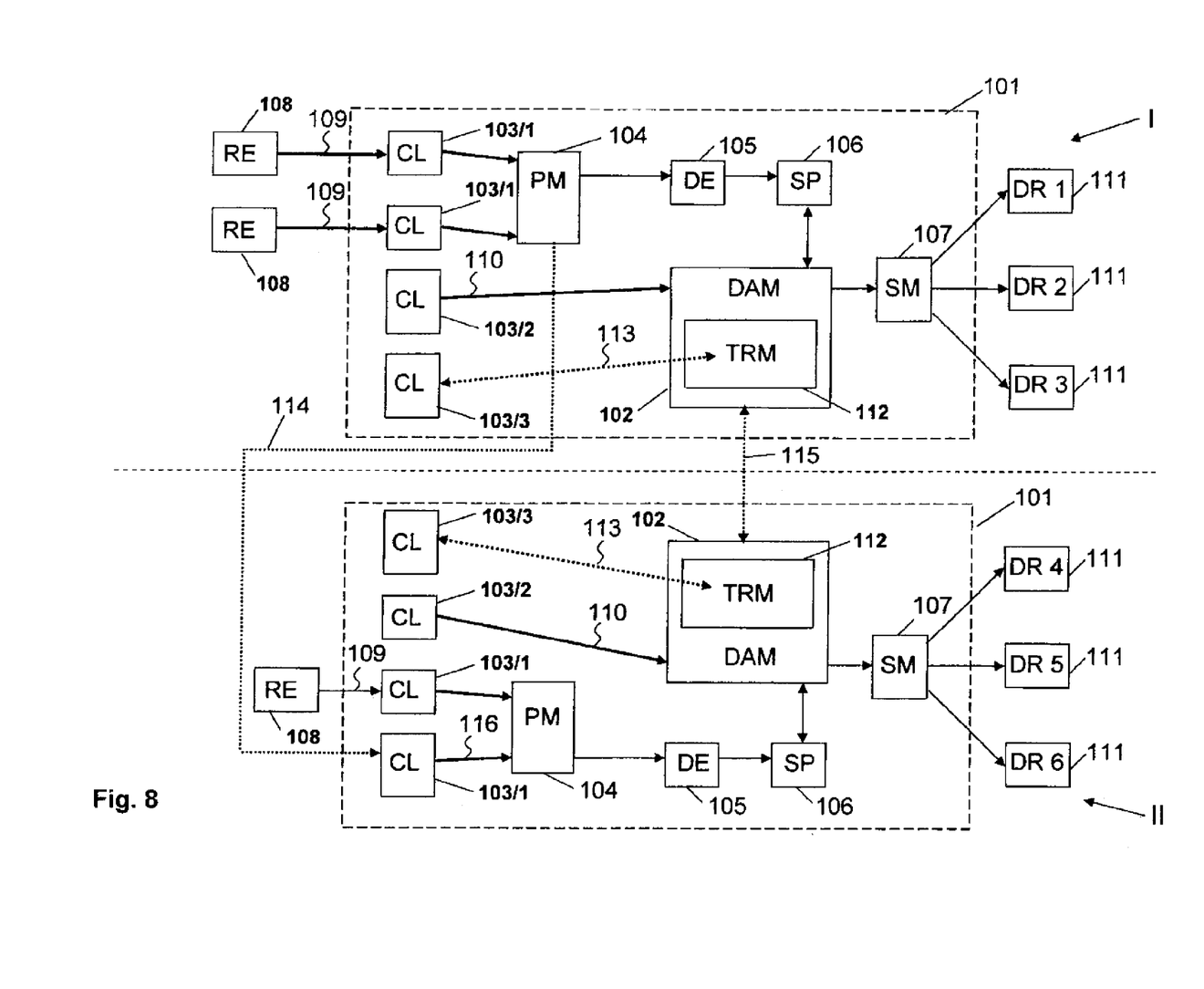
FIG. 8 illustrates essential parts of two printing systems for the execution of a method to mirror print jobs, schematically simplified in a block diagram.

With the method to mirror print jobs (FIG. 8), print jobs arriving at a print server 101 of a first printing system I are automatically mirrored at a print server 101 of a second printing system II.

The print server 101 respectively possesses a print job manager 102 (DAM), multiple clients 103, a buffer module 104 (PM), a decompression module 105 (DE), a memory unit 106 (SP) and a spool module 107 (SM) (FIG. 1).

In the present exemplary embodiment, three different types of clients (CL) are provided, namely input modules 10311, a print job client 103/2 and a ticket rule client 103/3.

Multiple input modules 103/1 are typically provided that are respectively connected via data lines 109 with one or more computers 108 (RE) to generate a print job. The input modules 103/1 serve to receive print data by means of protocols. Such an input module 103/1 can, for example, be designed to receive print data by means of the Download protocol or the LP protocol. Such an input module can also be a HotDir folder. The download interface is designed as a program that runs in the background, wherein typically no direct user intervention occurs. Under Unix and its derivatives such programs are designated as daemons (Disc and Execution Monitor). In Microsoft Windows the corresponding programs are called "Services". A daemon can run even if no user is logged in at the computer.

The print job manager 102 and the input modules 103/1 are typically arranged at an operator of a printing center, and the computers 108 to generate the print jobs are located at the customers of the operator of the printing system and transmit their print jobs to the input modules via a network, for example the Internet.

The clients 103 and the print job manager 102 are respective computer program units. They can be installed and executed on a common computer. However, it is likewise possible to install at least the print job manager 102 and the clients 103 on at least two separate computers and to execute them there.

The print job manager is also designated as a PJM server (print job manager server). The print job client 103/2 corresponding to the print job manager 102 is connected with the print job manager 102 and serves so that the operator of the printing system can execute print jobs that are already present. Such print jobs are, for example, print jobs that could not be or could not be correctly printed. With the aid of the print job client 103/2, the operator can modify the print job (and in particular the job ticket of such a print job) and transmit the respective print job to the print job manager 102 in order to have it printed at a printing apparatus 111 (DR).

Print jobs arriving at the input modules 103/1 are relayed to the buffer module 104 via an interface 116 and stored at the buffer module 104. The decompression module 105 reads out the buffered print jobs and decompresses the data.

The decompression module 105 is advantageously also designed with a decryption function so that it also decrypts the data. The decompressed and decrypted print data are stored in the memory unit 106.

The print jobs stored in the memory unit 106 are read by the print job manager 102 in order to be relayed to the spool 107.

Among other things, the print job manager serves to inspect the job chaperone data contained in the print jobs and to generate job tickets specific to the respective printing system.

The print job manager 102 extends the job chaperone data of the incoming print jobs with data (in particular control parameters) from a specification job ticket. In particular, control parameters that are missing but necessary in the existing print environment are added to the job chaperone data. In the event that a whole job ticket should be present, the data (in particular control parameters of the who job ticket) are also added to the printing system-specific job ticket.

The print job manager 102 has a ticket rule module 112 (TRM) in which ticket rules are stored. The ticket rules are administered by means of the ticket rule module and executed at the print job manager.

The ticket rule module 112 has an interface 113 with the ticket rule client 103/3 via which a bidirectional communication is possible. The ticket rule client 103/3 comprises a rule editor module with which the ticket rules stored in the ticket rule module can be edited. The rule editor module is provided with a graphical user interface (GUI).

The ticket rule module 112 can also be connected with multiple ticket rule clients 103/3. However, all ticket rules are exclusively stored in the ticket rule module 112 at the print job manager 102. Only the ticket rules stored in the ticket rule module 112 can be accessed with the ticket rule clients 103/3, and these ticket rules can only be modified at the ticket rule module 112.

The job ticket contains a list of control parameters to control the respective print job.

The ticket rules comprise a sequence of actions that are applied to incoming job chaperone data of the received print job.

The print jobs arriving at a first printing system I are copied by the buffer module 104, and the copy is transferred via a data line 114 to an input module 103/1 of a second print job II. This copy contains the print jobs in the compressed and encrypted state. This is advantageous for the transfer from printing system I to printing system II since these two printing systems are normally arranged far removed from one another, and the compressed data can be transferred significantly more quickly than uncompressed data.

Moreover, with regard to the method of mirroring of the print data from printing system I to printing system II, refer to the German Patent Application DE 10 2006 044 870.7; the entire content of which is incorporated into the present patent application.

The mirrored print data are written into the second printing system II via the input module 103/1, the buffer module 104, the decompression module 105, and the memory unit 106.

At the first printing system I the incoming print data are also decompressed and decrypted by the decompression module 105 and then stored in the memory unit 106. With regard to the respective print jobs, printing system-specific job tickets are created using the job chaperone data by the print job manager 102 of the first printing system I. In principle this occurs in the same manner as is described in the German Patent Application "Verfahren, Drucksystem und Computerprogramm zum automatischen Bearbeiten von Auftragsbegleitdaten eines Druckauftrags", filed on 28 Feb. 2007, which is why reference is made in this regard to this patent application.

In a first embodiment of the invention, the job ticket specified to the first printing system I is mirrored on the print server of the second printing system II. This job ticket is then designated as a mirror job ticket. This is primarily appropriate when the second printing system II has the same resources and printing apparatuses as the first printing system I. The print job can then be directly executed at the second printing system.

To mirror the mirror job tickets, the print job managers 102 of the two printing systems I and II are coupled with one another with a data connection 115. The data connection has interfaces to the two print job managers 102. However, this physical data connection 115 is based on the same lines as the data line 114 for mirroring of the incoming print data. Since the print data are stored on the second printing system II together with the mirror job tickets specific to the first printing system I, given a temporary failure of the first printing system I in which the print data stored at the first printing system I are damaged, these—together with the mirror job ticket—can be copied back from the print server 101 of the second printing system II to the print server 101 of the first printing system I and be executed without further delay at the first printing system I.

According to a second embodiment of the method for mirroring print jobs, in addition to the job ticket specific to the first printing system I a second job ticket specific to the second printing system II is generated at the print server 101 of the first printing system I. This second job ticket is mirrored on the print sever 101 of the second printing system II and thus represents a mirror job ticket. For this a specification job ticket specific to the second printing system II is stored at the print server 101 of the first printing system I, the control parameters of which specification job ticket are used to supplement the job chaperone data to generate the job ticket specific to the second printing system II. The inspection of the job chaperone data and generation of the job ticket specific to the second printing system II is executed by means of the ticket rules stored in the ticket rule module 112. The ticket rules can contain control parameters specific to the respective printing system that it enters into a specific job ticket.

If a problem occurs at the first printing system I, the printout of the print job can be implemented at the second printing system II without delay with the mirror job ticket specific to the second printing system II.

In a third embodiment of the method for mirroring print jobs, both a mirror job ticket specific to the first printing system I and a mirror job ticket specific to the second printing system II are generated at the first printing system I, and both are mirrored on the print server 101 of the first printing system II. Give a problem at the print server 101 of the first printing system I, the possibility exists both to copy the print data with the corresponding job ticket back to the first printing system I or to print out the print data directly at the second printing system II. In this embodiment, it is additionally advantageous when both mirror job tickets are also stored at the print server of the first printing system I since then all data for implementation of a printout at an arbitrary one of the two printing systems I and II are present at both printing systems.

In a fourth embodiment of the method for mirroring print jobs, the job chaperone data are extracted from the print data at the print server 101 of the first printing system I and are transmitted to the print server 101 of the second printing system II either immediately or after a pre-processing at the print server 101 of the second printing system II. A job ticket specific to the second printing system II is then generated at the print server 101 of the second printing system II. The extraction of the job chaperone data can simply occur via a copying of the job chaperone data present as a file in the form of a data ticket. However, the extraction can also comprise the collection of job chaperone data from different sources, in particular the file name of the print job and one or more files containing job chaperone data. For example, the pre-processing of these job chaperone data can contain an assembling of the data from different sources into a common file. However, this pre-processing can also be the generation of the job ticket specific to the first printing system I, which job ticket is relayed to the print server 101 of the second printing system II and there is converted into a job ticket specific to the second printing system II. The job ticket generated at the second printing system II and specific to the second printing system II can in turn be mirrored on the print server 101 of the first printing system I. It is likewise appropriate to copy the job ticket specific to the first printing system I to the second printing system II.

It is common to all embodiments described above that the mirrored print jobs and the corresponding job tickets are blocked at the second printing system II until the data connection between the mirrored printing systems is interrupted or, if the block is manually lifted, are blocked such that they cannot be executed during the block. Only after the expiration of this duration can an operator of the second printing system II start the printout of the respective print job or transmit the corresponding print data back to the first printing system I together with the corresponding job ticket. This must be manually started so that a print job is not simultaneously executed at two different printing systems by accident, which would lead to significant costs. The operator can be informed about the status of the respective printing systems before the start of the mirrored print job.

Since the mirrored print data are supplied to the second printing system II in a conventional manner via the input module 103/1, and the information that the print data are blocked has already been added to the print data in the buffer module 104 of the first printing system I, the print server 101 of the second printing system II does not need to be specially configured for use as a mirror server. It processes the mirrored print data arriving from the print server 101 of the first printing system I just like all other incoming print data. At the second print server II, an interface at the data connection 115 for execution of the mirroring method is only provided at the print job manager 102. However, this interface is likewise arranged at the print job manager 10 of the first print server 101. It is also possible that the print servers 101 of the two printing systems mutually mirror the respective print jobs, wherein this can also occur simultaneously. However, blocked print jobs are not mirrored because otherwise the two print servers with a single print job would block each other due to the continual back-and-forth mirroring of a print job.

It is also possible to execute the mirroring from an output print server to multiple mirror print servers at which one copy of the print data and the corresponding specific or non-specific job tickets are respectively stored.

The print data contained in the print jobs are processed at a first printing system I. This processing can comprise different processing processes, for example the rastering of the print data contained in the print jobs and the adaptation of the print page arrangement corresponding to the post-processing apparatuses connected to the printing system.

The rastering of the print data is a very work-intensive procedure that can last a long time. It is therefore appropriate that, depending on the processing progress, a new job ticket is generated that especially contains information for the remaining processing steps to be executed or contains information that recognize the portion already executed. For example, information of which parts of a print job that require a raster process (RIP) in the print server (for example Postscript data) have already been processed can be stored in such a job ticket. This job ticket reflecting the processing progress is appropriately mirrored as a mirror job ticket on the print server 101 of the second printing system II. The print data already processed are also advantageously copied to the print server 101 of the second printing system II. Given a problem at the first printing system I, it is hereby possible to continue the execution of the respective print job with the already-achieved processing progress at the second printing system II.

In principle, the print jobs on the print server 101 of the first printing system I are located in an execution state, in contrast to which the print jobs mirrored on the print server 101 of the mirror printing system II are located in a blocked pause state. These two print servers 101 are synchronized with one another such that, if a print job located in an execution state is deleted by an operator, the corresponding mirrored print job is automatically also deleted; this synchronization is broken when the data line 114 or the data connection 115 between the two printing systems I, II is interrupted. Such an interruption leads to the cancelation of the blocking of the mirrored print job at the mirror printing system II.

Furthermore, it is possible to configure the mirroring method executed in the buffer module 104 differently. This configuration occurs in the buffer module 104 of the mirroring print server 101. How the buffer module 104 continues the mirroring when an error occurs in the transfer of the mirrored data or in the reception of the mirrored data by the mirror printing system II is set with this configuration. The following rules can hereby be set:
(1) Termination of the data transfer from the sending print server to the receiving print server when an error occurs in the copying to the print server of the mirror computer system.
(2) Continuation of the data transfer from the sending print server to the receiving print server even given an error at the receiving print server.
(3) Continuation of the data transfer from the sending print server to the receiving print server only if n copies of the data to be secured have been successfully generated on other print servers.
(4) Switching of the copying process to a predetermined different mirror printing system if an error occurs at the actual receiving print server of the mirror computer system.

In the event of error, there are two possibilities of how an error can be corrected at a mirror printing system (error recovery). On the one hand, it can be sought to copy all print data or data units that have been received at the receiver since the occurrence of the error to the mirror printing system. On the other hand, the mirroring printing system can also be configured such that the print data received since the occurrence of the error are no longer copied to this mirror printing system.

In the method for mirroring print jobs, the incoming print data are first immediately mirrored. This occurs in the buffer module 104. However, this can also be executed in one of the input modules 103/1. All print data (i.e. the print data to be printed and the job chaperone data) are hereby mirrored. It is essential to the preferred embodiment that job tickets specific to the printing systems are additionally generated from the job chaperone data, which job tickets are then also immediately mirrored. The generation of the job tickets occurs via application of ticket rules to the incoming job chaperone data. These ticket rules link the job chaperone data with specification job tickets. The specification job tickets are specific to the respective printing systems. The specification job tickets are also specific to the different input modules 103/1, such that in total six different specification job tickets are to be provided given three different input modules and two different printing systems, for example.

The ticket rules can be invoked in different ways:
(1) The ticket rules are invoked by the input module in the relaying of the print jobs, wherein with the invocation the input module relays a parameter that specifies which ticket rule is applied to the respective print job or its job chaperone data.
(2) A specific ticket rule is automatically executed depending on the input module via which the print job is received.
(3) A specific ticket rule for generation of one or more mirror job tickets is invoked depending on the mirroring method in the buffer module 104.

Multiple ticket rules for the generation of a respective specific job ticket can thus be invoked independent of one another.

With the method for mirroring print jobs, the conventional known mirroring methods are thus expanded by a processing stage in which the job chaperone data are additionally processed into job tickets specific to the printing systems, which job tickets are then also mirrored.

Although preferred exemplary embodiments have been shown and described in detail in the drawings and in the preceding specification, they should be viewed as merely exemplary and not as limiting the invention. It is noted that only the preferred exemplary embodiments are presented and described, and all variations and modifications that presently and in the future lie within the protective scope of the invention should be protected.

We claim as our invention:

1. A method for reception of print data from a sender of a print job by a print server of a first printing system, comprising the steps of:
with the print server of the first printing system acknowledging to the sender correct receipt of a predetermined data unit of print data according to a predetermined protocol;
with the print server of the first printing system copying only the print data to a mirror print server of a second printing system designed to be separate from the print server of the first print system before execution of the respective acknowledgement for the predetermined data unit; and
automatically using as a print server for continued execution of the print job given problems in storage of the print data on the print server of the first printing system said mirror print server of the second printing system.

2. A method according to claim 1 wherein in the event of an error in the reception of the data in the mirror print server of the second printing system the method proceeds according to at least one of the following rules:

terminating the data transfer from the sender to the print server of the first printing system when an error occurs in the copying to the mirror print server of the second printing system;

continuing the data transfer from the sender to the print server of the first printing system even given an error at the mirror print server of the second printing system;

continuing the data transfer from the sender to the print server of the first printing system only if n copies of the data to be secured have been successfully generated at other print servers; and switching the copying process to a predetermined different mirror printing system if an error occurs at the print server of the first printing system.

3. A method according to claim 1 wherein the processing of the print data is continued at the print server of the first printing system.

4. A method according to claim 1 wherein the acknowledgement of the correct receipt is executed only after successful execution of the copying of the corresponding data unit of the print data.

5. A method according to claim 1 wherein the transfer of the print data is terminated when the copying of the data unit of the print data has not been executed correctly.

6. A method according to claim 1 wherein the correct receipt of the print data by the print server of the first printing system is acknowledged even if the data unit of the print data could not be correctly copied, insofar as the data unit could be correctly received without copying.

7. A method according to claim 1 wherein a first mirror computer system is provided for storing the print data, and the print data are copied to an additional mirror computer system if the first mirror computer system cannot correctly store the print data.

8. A method according to claim 1 wherein the transfer of the print data from the sender to the print server of the first printing system occurs by means of a secured data connection.

9. A method according to claim 1 wherein the print data are encrypted by the sender and are copied by the print server of the first printing system before the decryption.

10. A method according to claim 1 wherein the print server of the first printing system copies the incoming print data block-by-block immediately after the receipt of a respective data block.

11. A method for reception of print data from a sender of a print job by a print server of a first printing system, comprising the steps of:

with the print server of the first printing system acknowledging to the sender correct receipt of a predetermined data unit of print data according to a predetermined protocol;

with the print server of the first printing system copying the print data to a mirror print server of a second printing system designed to be separate from the print server of the first print system before execution of the respective acknowledgement for the predetermined data unit;

automatically using as a print server for continued execution of the print job given problems in storage of the print data on the print server of the first printing system said mirror print server of the second printing system; and for the reception of the print data by a receiver from said sender transferring the print data according to the predetermined protocol, wherein the receiver checks whether the print data from the sender was originated from the correct sender and wherein the receiver checks the correctness of the sender with an interface module to receive the print data using multiple parameters that are contained in a header according to the predetermined protocol of the print data before the print data are released by the interface module for the storage.

12. A method according to claim 11 wherein at least one of the parameters co-determines a content of the print job.

13. A method according to claim 11 wherein the parameters of the headers are used to inspect the print data.

14. A method for reception of print data from a sender of a print job by a print server of a first printing system, comprising the steps of:

with the print server of the first printing system acknowledging to the sender correct receipt of a predetermined data unit of print data according to a predetermined protocol;

with the print server of the first printing system copying the print data to a mirror print server of a second printing system designed to be separate from the print server of the first print system before execution of the respective acknowledgement for the predetermined data unit;

automatically using as a print server for continued execution of the print job given problems in storage of the print data on the print server of the first printing system said mirror print server of the second printing system; and for mirroring print jobs that contain job chaperone data via a mirror print server of the first printing system to the mirror print server of the second printing system, the mirror print server of the first printing system mirroring the received print jobs on the mirror server of the second printing system, creating at least one mirror job ticket using the job chaperone data, and copying the mirror job ticket to the mirror server of the second printing system.

15. A method according to claim 14 wherein the mirror job ticket is designed specifically for the mirror server of the second printing system so that the corresponding print data with the mirror job ticket can be printed out directly at the second printing system.

16. A method according to claim 14 wherein the mirror job ticket is designed specific to the first printing system comprising the first print server so that the corresponding print data with the mirror job ticket can be printed out at the first printing system.

17. A first printing system, comprising:

a first printing system comprising print server comprising at least one input module to receive print jobs;

a buffer module to buffer the print jobs received by the at least one input module and to mirror the print jobs on a mirror print server of a second printing system;

a memory unit to store the incoming print jobs;

a print job manager to create job tickets specific to the first and second printing systems;

the print job manager being designed to mirror such a job ticket as a mirror job ticket on the mirror print server of the second printing system;

the print server of the first printing systems acknowledging to the sender correct receipt of a predetermined data unit of print data according to a predetermined protocol;

the print server for the first printing system copying only the print data to said mirror print server of said second printing system before execution of the respective acknowledgement for the predetermined data unit; and said mirror print server of the second printing system being automatically used as a print server for continued execution of the print job given problems in storage of the print data on the print server of the first printing system.

18. A non-transitory computer-readable medium comprising a computer program for reception of print data from a sender of a print job by a print server of a first printing system, said program performing the steps of:

with the print server of the first printing system acknowledging to the sender correct receipt of a predetermined data unit of print data according to a predetermined protocol;

with the print server of the first printing system copying only the print data to a mirror print server of a second printing system designed to be separate from the print server of the first print system before execution of the respective acknowledgement for the predetermined data unit; and automatically using as a print server for continued execution of the print job given problems in storage of the print data on the print server of the first printing system said mirror print server of the second printing system.

* * * * *